United States Patent
Ramberg et al.

(10) Patent No.: US 7,869,439 B1
(45) Date of Patent: Jan. 11, 2011

(54) VARYING PACKET SWITCH BEHAVIOR BASED ON A QUANTITY OF VIRTUAL INTERFACES ASSOCIATED WITH A VIRTUAL SWITCH

(75) Inventors: Steven Richard Ramberg, Veradale, WA (US); Andrew Patrick Schultz, Spokane, WA (US); Loren Douglas Larsen, Lindon, UT (US)

(73) Assignee: World Wide Packets, Inc., Spokane Valley, WA (US)

( * ) Notice: Subject to any disclaimer, the term of this patent is extended or adjusted under 35 U.S.C. 154(b) by 615 days.

(21) Appl. No.: 11/735,642

(22) Filed: Apr. 16, 2007

(51) Int. Cl.
    *H04L 12/56* (2006.01)
(52) U.S. Cl. .................. 370/395.54; 370/400
(58) Field of Classification Search ............ None
    See application file for complete search history.

(56) References Cited

U.S. PATENT DOCUMENTS

| | | | |
|---|---|---|---|
| 6,356,551 B1 * | 3/2002 | Egbert ................ | 370/389 |
| 7,149,214 B2 * | 12/2006 | Wu et al. ............ | 370/389 |
| 7,286,491 B1 * | 10/2007 | Smith ................ | 370/256 |
| 2004/0218551 A1 * | 11/2004 | Goldberg et al. .... | 370/256 |

* cited by examiner

*Primary Examiner*—Chirag G Shah
*Assistant Examiner*—Daniel Mitchell
(74) *Attorney, Agent, or Firm*—Clements Bernard PLLC; Christopher L. Bernard; Tyler S. Brown

(57) ABSTRACT

Packet switch operating methods and packet switches compare a quantity of virtual interfaces associated with a virtual switch to a threshold. If the quantity of virtual interfaces is not greater than the threshold, and the packet switch is configured to learn forwarding fields of packets forwarded by the virtual switch, the methods and switches configure the packet switch to not learn forwarding fields of packets subsequently forwarded by the virtual switch. Other methods and packet switches compare a quantity of virtual interfaces associated with a virtual switch to a threshold. If the quantity of virtual interfaces associated with the virtual switch is not greater than the threshold and the packet switch is configured to learn forwarding fields of packets forwarded by the virtual switch, the methods and packet switches configure the packet switch to not learn forwarding fields of packets subsequently forwarded by the virtual switch.

24 Claims, 7 Drawing Sheets

| VIRTUAL SWITCH | VIRTUAL INTERFACE | ADDRESS |
|---|---|---|
| 216 | 224 | xABCD |
| 216 | 224 | x12AB |
| 216 | 220 | x1234 |
| 216 | 220 | xABC3 |
| 216 | 228 | xFFAA |
| 218 | 232 | FLOOD |
| 218 | 234 | FLOOD |

| VIRTUAL SWITCH | VIRTUAL INTERFACE | ADDRESS |
|---|---|---|
| 216 | 220 | FLOOD |
| 216 | 224 | FLOOD |
| 218 | 232 | FLOOD |
| 218 | 234 | FLOOD |

FIG 5

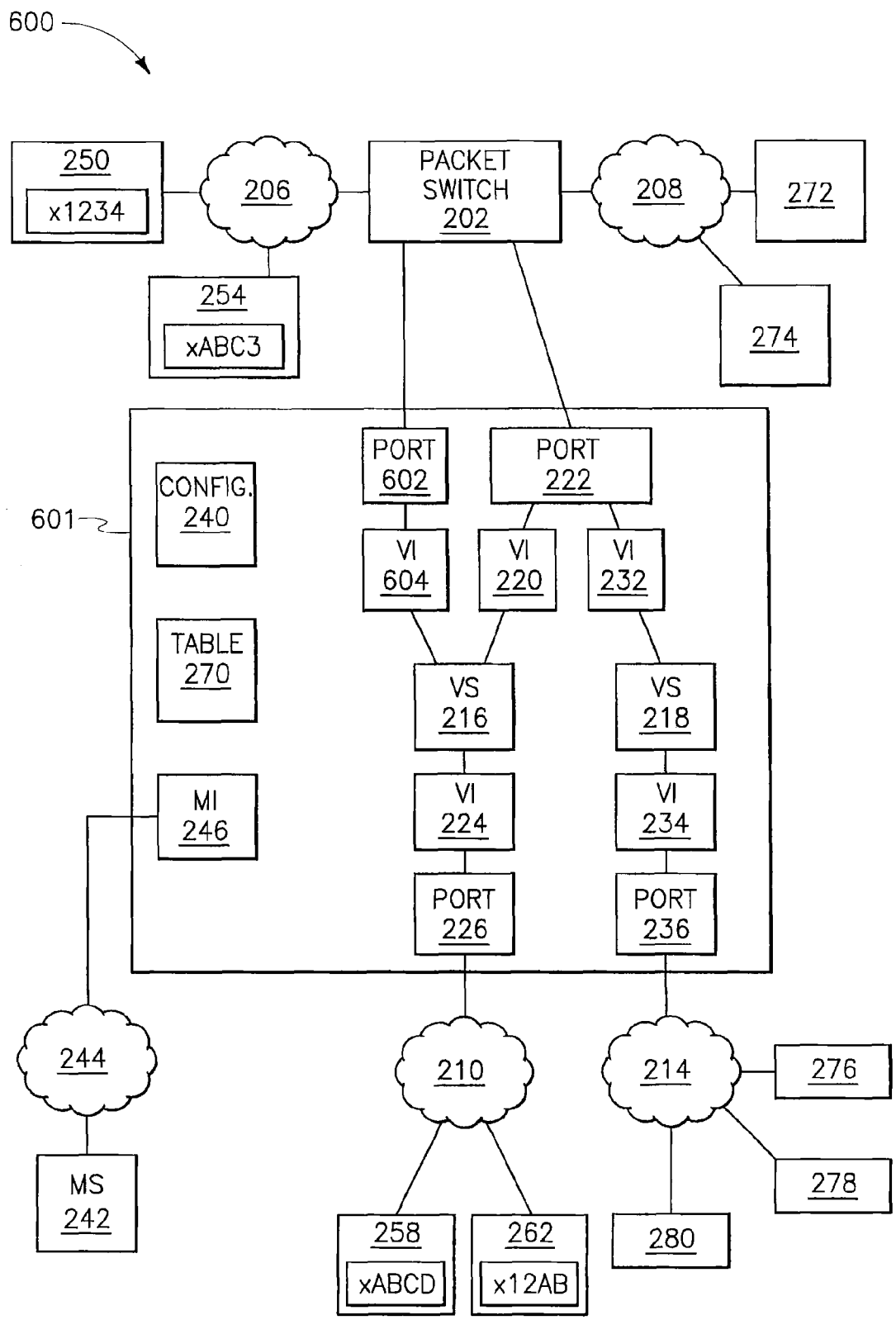

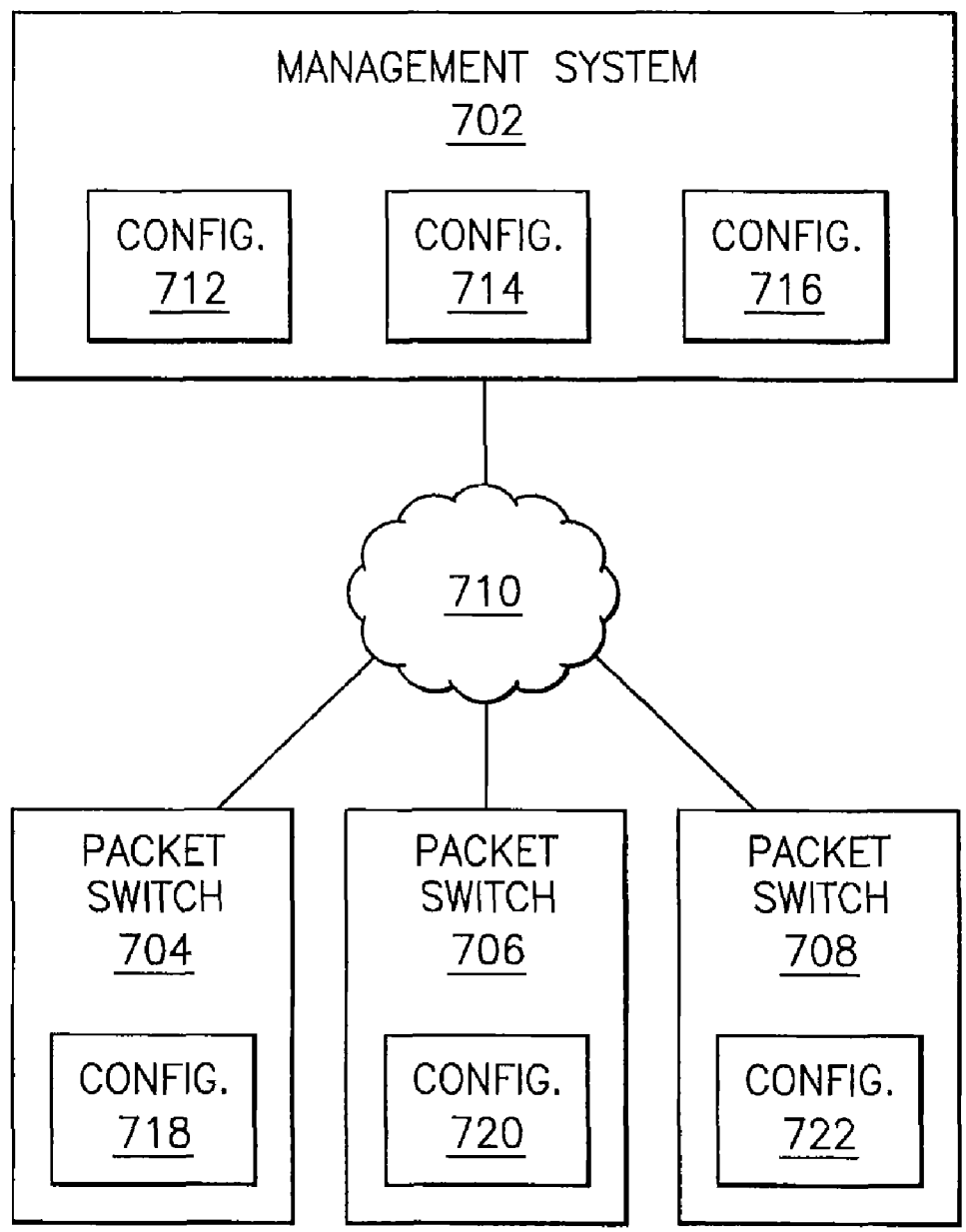

VARYING PACKET SWITCH BEHAVIOR BASED ON A QUANTITY OF VIRTUAL INTERFACES ASSOCIATED WITH A VIRTUAL SWITCH

TECHNICAL FIELD

The present invention, in various embodiments, relates to methods and packet switches configured to vary packet switch behavior based on a quantity of virtual interfaces associated with a virtual switch.

BACKGROUND OF THE INVENTION

Ethernet is ubiquitous in enterprise networks where it is used to facilitate communication between computers. Each device that communicates via an Ethernet network is assigned a unique Medium Access Control (MAC) address. An Ethernet switch typically determines a destination port for each packet it receives based on learning MAC addresses of packets previously received by the switch.

Due to its many attractive features, Ethernet is now common in service provider networks as well as enterprise networks. Since service provider networks may have thousands of devices connected to them, a service provider packet switch may need to learn a large number of MAC addresses.

The service provider packet switch typically stores these MAC addresses in high-speed memory. In order to store a large number of MAC addresses, a large amount of high-speed memory is required. This large amount of high-speed memory tends to make Ethernet service provider packet switches expensive.

BRIEF DESCRIPTION OF THE DRAWINGS

Preferred embodiments of the invention are described below with reference to the following accompanying drawings.

FIG. 3 illustrates an exemplary table that may be used by one of the packet switches of FIG. 2.

FIG. 5 illustrates an exemplary table that may be used by one of the packet switches of FIG. 4.

FIG. 6 illustrates a logical representation of a system comprising a packet switch having a primary path and a backup path.

FIG. 7 illustrates a logical representation of a system including a management system and a management network.

DETAILED DESCRIPTION OF THE PREFERRED EMBODIMENTS

Figure 1:
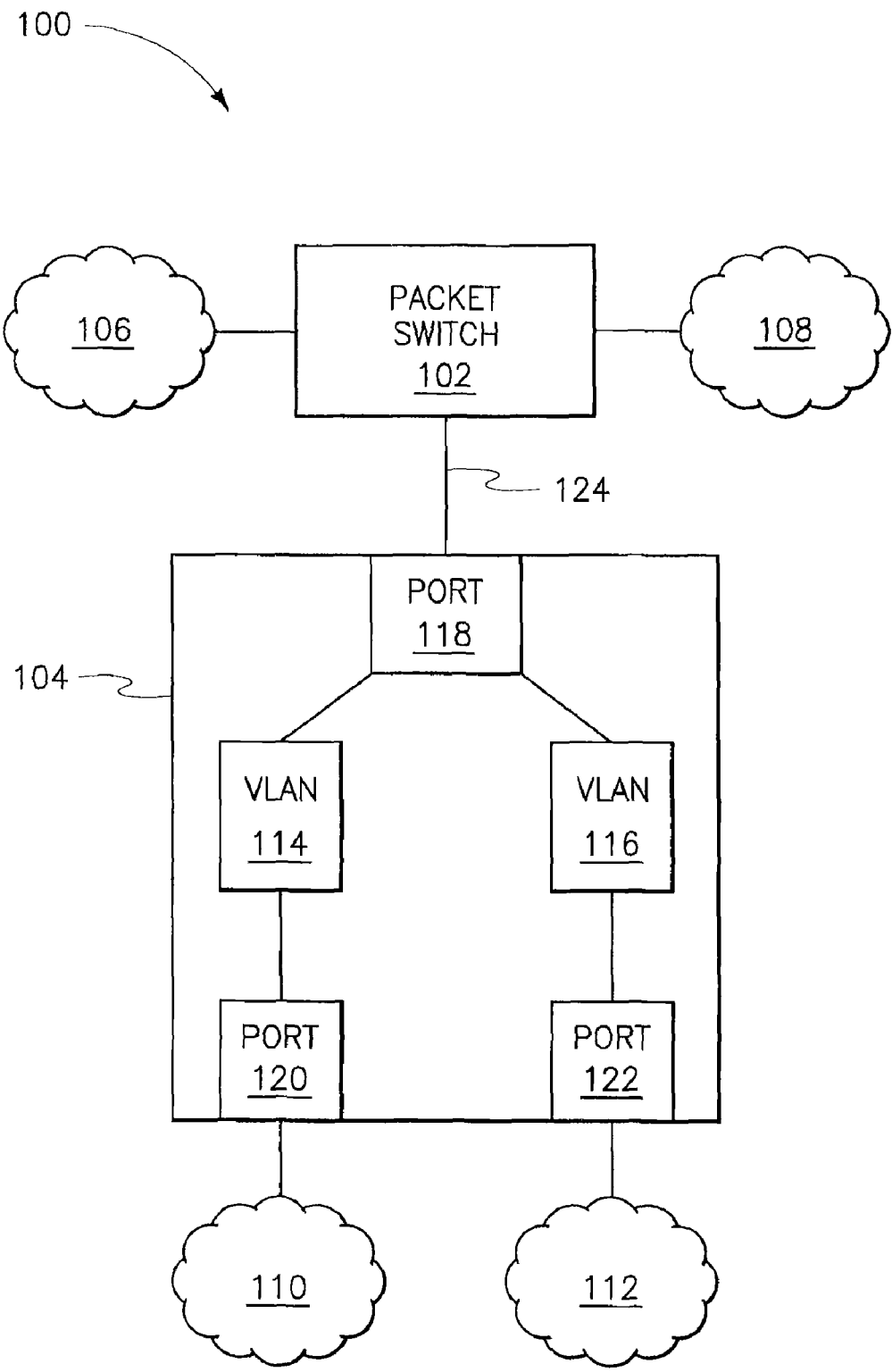
FIG. 1 illustrates a logical representation of a service provider network comprising a packet switch having two Virtual Local Area Networks (VLANs).

FIG. 1 illustrates an exemplary service provider network 100. Network 100 includes two packet switches, packet switch 102 and packet switch 104. Packet switch 102 and packet switch 104 enable connectivity between a network 106 and another network 110 and between a network 108 and another network 112. Network 106 and network 108 may be service provider networks.

For example, network 106 may be an Internet service provider network that provides Internet connectivity to network 110. Similarly, network 108 may be a network owned by a different Internet service provider that provides Internet connectivity to network 112.

Packet switch 102 may be located in a service provider office or carrier hotel so as to be physically connected to network 106 and network 108. Packet switch 104, on the other hand, may be placed in a remote location a large distance from packet switch 102. For example, packet switch 104 may be located in an outdoor cabinet within a business district where it connects to networks 110 and 112, which may be enterprise networks associated with two different businesses within the business district. Of course, additional packet switches (not illustrated to maintain simplicity) may intermediately connect packet switch 102 to packet switch 104.

Packet switch 104 includes two VLANs, VLAN 114 and VLAN 116. These VLANs may be used to separate packets belonging to the service provider associated with network 106 from the service provider associated with network 108. Packet switch 104 also includes three ports, port 118, port 120, and port 122. Of course, packet switch 104 could include additional VLANs and/or additional ports.

Port 120 is associated with VLAN 114 so that packets received from network 110 on port 120 are assigned to VLAN 114. VLAN 114 is also associated with port 118. Similarly, port 122 is associated with VLAN 116 so that packets received from network 112 on port 122 are assigned to VLAN 116. Port 118 is associated with VLAN 116 in addition to being associated with VLAN 114.

Port 118 is connected to packet switch 102 via link 124. Since port 118 is connected to both VLAN 114 and VLAN 116, link 124 relays packets from both VLAN 114 and VLAN 116 to packet switch 102. Packet switch 102 may receive packets from both VLANs on link 124 and forward packets associated with VLAN 114 to network 106 and forward packets associated with VLAN 116 to network 108.

In this manner, packet switch 104 provides an aggregation function by aggregating traffic from networks 110 and 112 and sending the aggregated traffic on a single link, link 124, to packet switch 102. Aggregation may be more economical than directly connecting network 110 to packet switch 102 and directly connecting network 112 to packet switch 102.

Due to the configuration of packet switch 104, VLAN 114 and VLAN 116 each have only two connections. VLAN 114 is connected to port 118 and port 120, and VLAN 116 is connected to port 118 and port 122.

Packet switch 104 may be configured to use traditional Ethernet learning when making a forwarding decision. For example, upon receiving a packet (either from port 118 or port 120), packet switch 104 may consult a forwarding table containing learned MAC addresses for VLAN 114 in deciding to which port the packet should be forwarded. The MAC addresses stored in the forwarding table may be learned from packets previously encountered by packet switch 104.

In further accord with traditional Ethernet learning, if a destination address of the received packet is found within the forwarding table, packet switch 104 determines which port is associated with the matching stored address and forwards the received packet to that port. If the destination address is not found within the forwarding table, packet switch 104 floods the packet to all of the ports associated with VLAN 114 except for the port on which the packet was received.

Networks 106, 108, 110, and 112 may each include a large number of devices. In relaying packets between these networks, packet switch 104 may learn a unique MAC address for each of these devices. Consequently, the forwarding table may contain a large number of MAC addresses.

Since VLAN 114 is associated with only two ports, the process of consulting a forwarding table to determine a destination port for a received packet is unnecessary. For example, if VLAN 114 receives a packet from port 120, VLAN 114 will forward the received packet to port 118 since port 118 is the only port associated with VLAN 114 other than the port on which the packet was received (port 120). Note that VLAN 114 will forward the received packet to port 118 whether or not the destination address of the received packet is found within the forwarding table.

Similarly, since VLAN 116 is also associated with only two ports, VLAN 116 need not consult a forwarding table in making forwarding decisions. Consequently, storing learned addresses in the forwarding table may unnecessarily consume a large amount of high-speed memory.

To avoid storing learned addresses, VLAN 114, VLAN 116, or both may be configured to flood received packets rather than consulting a forwarding table. This may advantageously reduce the amount of high-speed memory used by packet switch 104.

Of course, if VLAN 114 is associated with three ports rather than two, flooding a received packet would unnecessarily forward the received packet to one of the ports. Thus, flooding may be advantageous for VLANs associated with two ports, but in some cases may not be advantageous for VLANs associated with more than two ports.

A VLAN may limit the ports of a packet switch to which a packet associated with a VLAN may be forwarded to the ports of the packet switch belonging to the VLAN. In some cases, a subset of the ports of a packet switch will be associated with a VLAN rather than all the ports of the packet switch. Accordingly, the VLAN forms a virtual switch within the packet switch. The packet switch may accommodate a plurality of VLANs and therefore a plurality of virtual switches.

A packet may be associated with a particular VLAN based on a the value of a VLAN identifier portion of the packet. Once the packet is assigned to the particular VLAN, the packet may be forwarded to one or more of the ports associated with the VLAN.

Other techniques may alternatively be used to create virtual switches and to associate packets with a particular virtual switch. A virtual switch may be associated with a subset of the ports of a packet switch through virtual interfaces.

According to one aspect of the invention, a packet switch receives a packet from one of a plurality of virtual interfaces associated with a virtual switch. If a quantity of the plurality of virtual interfaces is not greater than a threshold, the packet switch forwards the packet to each of the plurality of virtual interfaces except the one virtual interface from which the packet is received. For some virtual switches, the threshold may be two virtual interfaces. For other virtual switches, the threshold may be greater than two virtual interfaces.

If the quantity of the plurality of virtual interfaces is greater than the threshold, the packet switch makes a further decision. If a destination address of the packet matches a stored address, the packet switch forwards the packet to a virtual interface of the plurality of virtual interfaces that is associated with the stored address. If there is no stored address matching the destination address, the packet switch floods the packet by forwarding the packet to each of the plurality of virtual interfaces except the one virtual interface from which the packet is received.

The destination address may be a layer-two Ethernet MAC address. The virtual switch may comprise a VLAN and the virtual interfaces comprise ports of the packet switch associated with the VLAN. For example, VLAN 114 described above in relation to FIG. 1 may act as a virtual switch.

The stored address may be stored in volatile memory of the packet switch, non-volatile memory of the packet switch, or other memory, such as memory external to the packet switch.

Figure 2:
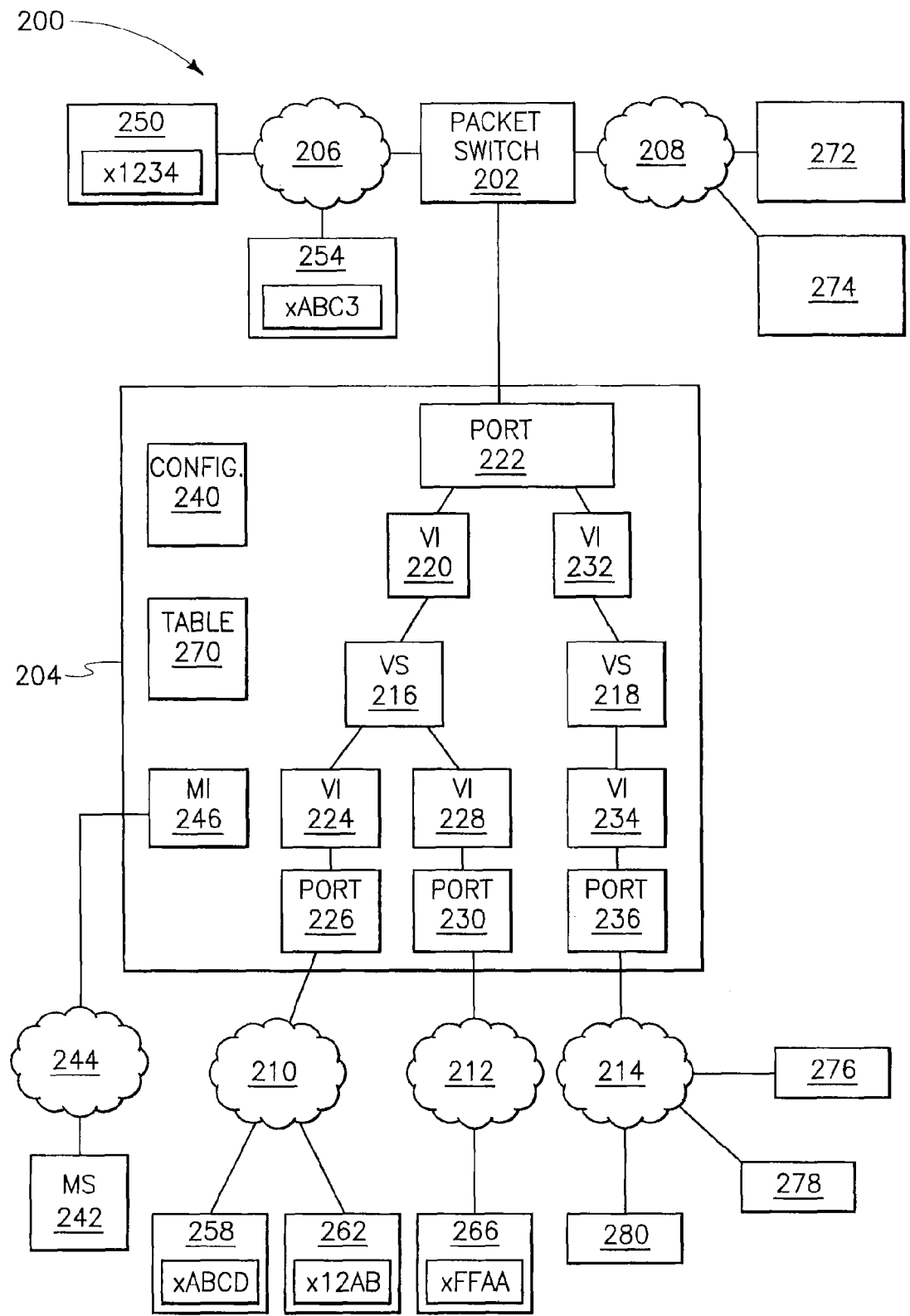
FIG. 2 illustrates a logical representation of a system comprising a packet switch having two Virtual Switches.

FIG. 2 illustrates a system 200 including a packet switch 204, which operates in accordance with this aspect of the invention. System 200 includes a packet switch 202 and another packet switch 204. These packet switches provide connectivity between a network 206 and other networks 210 and 212, and provide connectivity between a network 208 and another network 214.

Packet switch 204 includes two virtual switches, virtual switch 216 and virtual switch 218. These virtual switches forward packets between virtual interfaces associated with the virtual switches.

Virtual switch 216 is associated with a virtual interface 220 which is associated with a port 222, a virtual interface 224 which is associated with a port 226, and a virtual interface 228 which is associated with a port 230. Virtual switch 218 is associated with a virtual interface 232, which is associated with port 222 and with a virtual interface 234 which is associated with a port 236.

Note that port 222 is associated with two virtual interfaces, virtual interface 220 and virtual interface 232. Consequently, port 222 transmits packets it receives from both virtual interface 220 and virtual interface 232 to packet switch 202. Furthermore, some packets received by port 222 from packet switch 202 are associated with virtual interface 220 and virtual switch 216 while other packets received by port 222 from packet switch 202 are associated with virtual interface 232 and virtual switch 218. Of course, packet switch 204 could include additional virtual switches, additional virtual interfaces, and/or additional ports.

Packet switch 204 may be associated with a threshold having a value of two. Accordingly, since virtual switch 216 is associated with three virtual interfaces (and is therefore above the threshold), virtual switch 216 is configured to employ traditional Ethernet forwarding by consulting a table 270 in making a forwarding decision for a received packet. If virtual switch 216 is unable to determine a destination virtual interface for the received packet after consulting table 270, virtual switch 216 floods the received packet.

In contrast, virtual switch 218 not above the threshold since virtual switch 218 is associated with two virtual interfaces. Accordingly, rather than following the rules of traditional Ethernet learning, virtual switch 218 is configured to flood packets it receives without consulting table 270.

Any virtual switch may limit the ports to which a packet associated with the virtual switch may be forwarded. For example, virtual switch 216 may receive a packet from virtual interface 220 and may forward the received packet either to virtual interface 224 or to virtual interface 228. Virtual switch 216 may not forward the received packet to virtual interface 234 since virtual interface 234 is not associated with virtual switch 216. Accordingly, virtual switch (VS) 216 may not forward packets to port 236 since there is not a virtual interface (VI) associated with VS 216 that is associated with port 236.

Port 222 is associated with both VS 216 and VS 218 and is able to transmit packets it receives from both VS 216 and VS 218 via VI 220 and VI 232 respectively to packet switch 202. In addition, port 222 is able to receive packets from packet switch 202 and decide on a packet-by-packet basis whether to forward the received packet to VI 220 or VI 232.

VS 216 may be used to relay packets between devices connected to network 206 and devices connected to either network 210, network 212, or both. For example, a device 250 with MAC address "x1234" is connected to network 206 as is a device 254 having MAC address "xABC3." Network 210 is connected to a device 258 having MAC address "xABCD" and a device 262 having MAC address "x12AB." Network 212 is connected to a device 266 having MAC address "xFFAA." Device 250 may communicate with device 258, device 262, or device 266 via VS 216. Similarly, device 254 may communicate with device 258, device 262, or device 266 via VS 216.

A configuration 240 may store associations between virtual interfaces and virtual switches. For example, configuration 240 may store an association between VS 216 and its virtual interfaces VI 220, VI 224, and VI 228. Similarly, configuration 240 may store an association between VS 218 and its virtual interfaces VI 232 and VI 234. Configuration 240 may be created by a user. For example, a user may connect directly to packet switch 204 and create configuration 240.

Alternatively, packet switch 204 may have a management interface 246. A management network 244 may connect management interface 246 to management system 242. Management system 242 may send configuration 240 to packet switch 204 via management network 244 and management interface 246. Management network 244 may be an in-band management network, an out-of-band management network, or other management network.

Since VS 216 is associated with three virtual interfaces, and is therefore above the threshold, when VS 216 receives a packet from any of its virtual interfaces it may make a forwarding decision based on table 270.

Table 270 may store associations between virtual interfaces. For example, table 270 may specify that packets having a particular destination address are to be forwarded to VI 224, and packets having a different destination address are to be forwarded to VI 228.

Table 270 may associate one or more of a number of different packet fields with a virtual interface. For example, table 270 may store an association between a virtual interface and a layer-three source address, a layer-three destination address, an Ethernet source address, an Ethernet destination address, a layer-four port number, a Virtual Private LAN Services (VPLS) tag value, a Multiprotocol Label Switching (MPLS) tag value, or other packet fields.

FIG. 3 illustrates a table 300 containing one example of possible contents. Table 300 may represent table 270 at a particular moment in time. The contents of table 300 are determined based on a set of example packets forwarded by VS 216. A row 302 of table 300 is populated by packet switch 204 after receiving a packet from device 258 on virtual interface 224. After receiving this packet, VS 216 examines the source MAC address of the packet, in this case "xABCD," and since it received the packet on VI 224, populates table 300 with row 302. Row 302 specifies that MAC address "xABCD" is associated with virtual interface 224 of virtual switch 216.

In the future, if VS 216 receives a packet having a destination address of "xABCD," when consulting table 300 it will know that it should forward the packet to VI 224 since MAC address "xABCD" is associated with VI 224. Similarly, if VS 216 receives a packet from device 262 it will populate a row 304 of table 300 associating MAC address "x12AB" with VI 224. Additional rows 306, 308, and 310 may be similarly populated in table 300 as a result of packets being sent by devices 250, 254, and 266 respectively.

Returning now to FIG. 2, when VS 216 receives a packet, it may consult table 300 to determine to which of its virtual interfaces it should forward the packet. For example, if VS 216 receives a packet from device 266 having a destination address of "x1234," it will forward the packet to VI 220 based on row 306 of table 300 and will not forward the packet to VI 224.

Since the number of VIs associated with VS 218 is below packet switch 204's threshold of two, when VS 218 receives a packet it floods the packet without consulting table 270. For example, VS 218 may receive a packet from VI 232 and flood the received packet by forwarding the received packet to VI 234 since VI 234 is the only virtual interface associated with VS 218 other than VI 232, which is the virtual interface on which the packet was received.

Alternatively, VS 218 may consult table 300 and table 300 may specify that VS 218 is to flood packets it receives. For example, row 312 specifies that VS 218 should flood packets received on VI 232 to all virtual interfaces associated with VS 218 other than VI 232 on which the packet was received. In this case, VS 218 will forward packets received from VI 232 to VI 234 since VI 234 is the only other VI associated with VS 218. Similarly, row 314 specifies that packets received by VS 218 from VI 234 are also to be flooded.

Alternatively, a single table entry (not illustrated) in table 300 may specify that VS 218 is to flood packets received on any VI of VS 218 by stating "any," "don't care," or something of similar meaning in the VI column of table 300.

Table 300 illustrates the advantage that VS 218 has in conserving memory space. VS 216 consumes a row of table 300 for each device that sends or receives packets via VS 216. Rows 302, 304, 306, 308, and 310 of table 300 are all associated with VS 216, since there are five devices, devices 250, 254, 258, 262, and 266 that relay packets through VS 216.

If an additional device is added to network 206, network 210 or network 212, an additional row may be added to table 300 since the additional device will have a unique MAC address that may be learned by packet switch 204. Thus, the size of table 300 grows according to the number of devices that relay packets through VS 216.

In contrast, only two rows of table 300 are required for VS 218 even if a large number of devices relay packets through VS 218. For example, five devices relay packets through VS 218, device 272, device 274, device 276, device 278, and device 280. Even though five devices relay packets through VS 218, only two rows are used in table 300.

According to another aspect of the invention, a packet switch compares a quantity of virtual interfaces associated with a virtual switch to a threshold. The threshold may be two, three, or may be greater than three.

If the quantity of virtual interfaces associated with the virtual switch is not greater than the threshold and the packet switch is configured to learn forwarding fields of packets forwarded by the virtual switch, the packet switch is configured to not learn forwarding fields of packets subsequently forwarded by the virtual switch. Consequently, the number of forwarding fields learned by the packet switch is reduced.

The packet switch may also be configured to learn forwarding fields of packets subsequently forwarded by the virtual switch if the quantity of virtual interfaces associated with the virtual switch is greater than the threshold and the packet switch is not configured to learn forwarding fields of packets forwarded by the virtual switch. Consequently, the packet switch reduces the number of packets forwarded unnecessarily to virtual interfaces.

The packet switch may detect a change in the quantity of virtual interfaces associated with the virtual switch prior to comparing the quantity to the threshold. Comparing the quantity of virtual interfaces may include inspecting a packet switch configuration to determine the quantity of virtual interfaces associated with the virtual switch.

Comparing the quantity of virtual interfaces and configuring the packet switch may be performed without user intervention.

Configuring the packet switch to learn forwarding fields may include configuring the packet switch to examine forwarding fields of packets received by the virtual switch and, for each of the forwarding fields that are unique, storing an association between the unique forwarding field, the virtual switch, and a virtual interface. The virtual interface may be the virtual interface of the plurality on which the packet having the unique forwarding field is received.

The forwarding field may be one or more predetermined portions of a received packet. For example, the forwarding field may include one or more of a layer-two source address, a layer-two destination address, a layer-three source address, a layer-three destination address, a layer-four port number, a backbone destination address, or a backbone source address. The position of the backbone destination address and backbone source address may be defined by the Institute of Electrical and Electronics Engineers (IEEE) 802.1ah standard.

The packet switch may include more than one virtual switch. In some cases, the virtual switch may comprise a VLAN and the virtual interfaces may include ports of the packet switch associated with the VLAN. The virtual switch may be configured to forward a packet received from one of the virtual interfaces to a different one of the virtual interfaces and may be configured to prevent the packet received from one of the virtual interfaces from being forwarded to a virtual interface associated with an additional virtual switch.

According to another aspect of the invention, a packet switch determines a quantity of ports of the packet switch associated with a VLAN subsequent to receiving a command to add a port to the VLAN from a user or a management system. If the quantity of ports associated with the VLAN is not greater than two and the packet switch is configured to learn layer-two source addresses of Ethernet packets forwarded within the VLAN, the packet switch, without user intervention, configures the packet switch to not learn layer-two source addresses of Ethernet packets subsequently forwarded within the VLAN.

The packet switch may also configure the packet switch to learn layer-two source addresses of Ethernet packets subsequently forwarded within the VLAN without user intervention if the quantity of ports associated with the VLAN is greater than two and the packet switch is configured to not learn layer-two source addresses of Ethernet packets forwarded within the VLAN.

Figure 4:
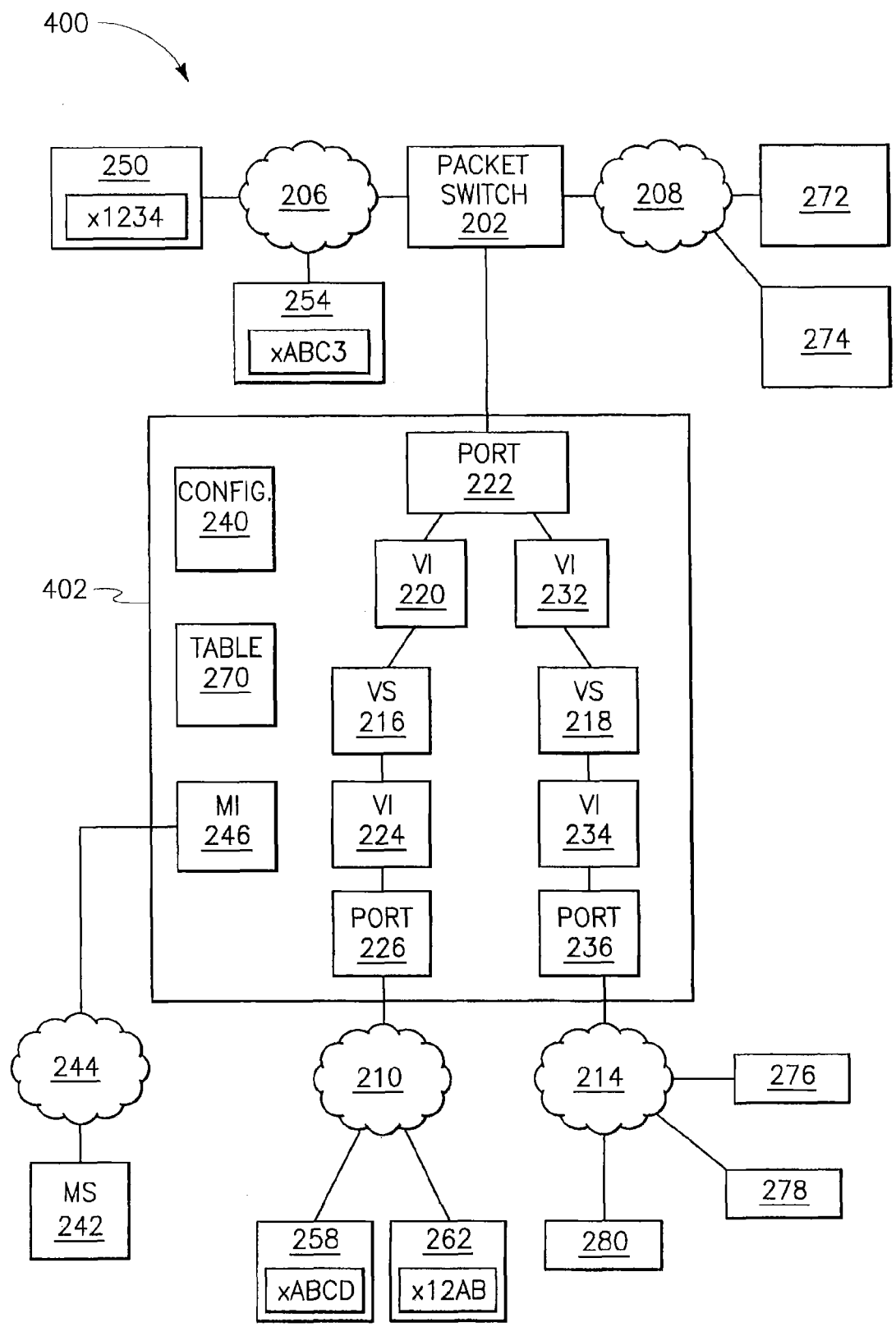
FIG. 4 illustrates another logical representation of a system comprising a packet switch having two Virtual Switches.

FIG. 4 illustrates a system 400. System 400 is similar to system 200 of FIG. 2 in that it includes packet switch 202; networks 206, 208, 210, and 214; and the devices connected to those networks. System 400 also includes another packet switch 402. Packet switch 402 is similar to packet switch 204, but has a different configuration of virtual switches and virtual interfaces than packet switch 204. Of course, packet switch 402 could include additional virtual switches, additional virtual interfaces, and/or additional ports.

In particular, VS 216 has a different configuration in packet switch 402 than in packet switch 204. VI 228 is no longer associated with VS 216. Consequently, VS 216 is now associated with two virtual interfaces, VI 220 and VI 224.

VI 228 may have been removed from VS 216 by a user. For example, a user may have connected to packet switch 204 and altered configuration 240 to remove the VI 228 from VS 216. Alternatively, management interface 246 may have received a configuration command from management system 242 specifying that VI 228 is no longer associated with VS 216.

As a result of receiving a command to remove VI 228 from VS 216, packet switch 204 may evaluate the number of virtual interfaces associated with VS 216. In this case, VS 216 is now associated with two virtual interfaces, VI 220 and VI 224.

Packet switch 402 may be configured with a threshold of two. If the number of virtual interfaces associated with the virtual switch is greater than the threshold, then packet switch 402 may configure the virtual switch to learn source addresses. If the number of virtual interfaces is less than or equal to the threshold, packet switch 402 may configure the virtual switch to not learn source addresses.

In this example, with a threshold of two, packet switch 402 detects that the number of virtual interfaces associated with VS 216 has changed from three to two. Consequently, packet switch 402 configures VS 216 so that it floods packets it receives on either VI rather than learning forwarding fields (e.g., source addresses) and populating the forwarding fields in table 270.

FIG. 5 illustrates one example of possible contents of table 270 in a table 500. In table 500, packet switch 402 may populate rows 502 and 504 to specify that packets received on VS 216 from VI 220 are to be flooded, in this case to VI 224, without learning the forwarding fields of these packets. Furthermore, row 504 specifies that packets received by VS 216 from VI 224 are to be flooded to VI 220 without learning the source addresses.

Since the number of virtual interfaces associated with VS 218 has not changed, packet switch 402 might not alter the contents of table 270 with respect to VS 218. For example, rows 506 and 508 specify that packets received by VI 232 and VI 234 are to be flooded, and forwarding fields are not to be learned on VS 218. This is because the number of virtual interfaces associated with VS 218 is less than or equal to the threshold of two.

Of course, if a new virtual interface is added to VS 218, the number of virtual interfaces associated with VS 218 will be greater than the threshold since the number will be three and the threshold is two. Consequently, packet switch 402 may configure VS 218 to begin learning forwarding fields of packets it receives on its virtual interfaces and to use the learned forwarding fields to forward packets subsequently received on its virtual interfaces rather than flooding packets to all of its virtual interfaces.

In this manner, packet switch 402 conserves the number of rows in table 270 by enabling learning on a virtual switch only if the number of virtual interfaces associated with the virtual switch is greater than the threshold. In addition to saving space, there may be some reduction in the amount of time spent forwarding a packet as well since a virtual switch for which learning has been disabled does not need to search through table 270 to determine if there is a learned forwarding field corresponding to the forwarding field of the received packet.

Although table entries 502, 504, 506, and 508 have been illustrated showing a flood entry, other approaches may be taken to prevent a virtual switch from learning forwarding fields. For example, packet switch 402 may be configured to completely ignore table 270 for a virtual switch that is configured to not learn forwarding fields. In such case, the virtual switch floods a packet it receives on any of its virtual interfaces to the virtual interfaces of the virtual switch except for the virtual interface on which the packet is received.

FIG. 6 illustrates a system 600. System 600 illustrates a particular configuration in which it may be advantageous to have a threshold of three rather than a threshold of two when determining whether a virtual switch should learn forwarding fields (e.g., source addresses) and consult table 270 or should flood packets it receives to its other virtual interfaces.

System 600 includes packet switch 202; networks 206, 208, 210, and 212; management network 244; management system 242; and the devices of FIG. 2 discussed above. System 600 also includes another packet switch 601. Packet switch 601 is similar to packet switch 402, but has a different configuration of virtual switches and virtual interfaces than packet switch 402. Of course, packet switch 601 could include additional virtual switches, additional virtual interfaces, and/or additional ports.

In particular, VS 216 has a different configuration in packet switch 601 than in packet switch 402. VS 216 is associated with an additional VI, VI 604. VI 604 is associated with a port 602. VS 216 may use port 602 and port 222 as a primary port and a backup port respectively. In this configuration, VI 604 may be used as a primary path for relaying packets from VS 216 to packet switch 202, and VI 220 may be used as a backup path to relay packets from VS 216 to packet switch 202.

Packet switch 601 may configure VI 604 and VI 220 to be mutually exclusive. For example, packet switch 601 may require that if VI 604 is actively relaying packets via port 602 to packet switch 202 that VI 220 does not relay packets via port 222 to packet switch 202. In a complementary manner, VI 220 may be enabled and VI 604 may be disabled. This configuration may provide a redundant connection between packet switch 601 and packet switch 202.

For example, if the connection between packet switch 601 and packet switch 202 is a critical one, a service provider may have two physical connections between the packet switches. One physical connection may be a strand of fiber-optic cable taking one physical path between packet switch 601 and packet switch 202, and the other physical connection may be in a different strand of fiber-optic cable taking a different physical path between packet switch 601 and packet switch 202.

Alternatively, port 602 may be connected to a first network which is connected to packet switch 202, and port 222 may be connected to a different network which is also connected to packet switch 202. The advantage of having two different physical connections or two different networks connecting packet switch 202 and packet switch 601 is that if one of the physical connections is disabled, for example due to a break in the cable, the other connection may be utilized. Consequently, any disruption of service between packet switch 202 and packet switch 601 may be minimized.

Packets switch 601 may be configured to drop packets associated with a virtual interface that are not on the primary path prior to transmitting the packets out of the port. For example, VS 216 may be configured with VI 604 as primary and VI 220 as backup. VS 216 may send packets received on VI 224 to both VI 604 and VI 220, even though VI 220 is only a secondary path. Upon receiving the packet, VI 220 may forward it to port 222, which may drop the packet.

Alternatively, VI 220 may drop the packet prior to forwarding the packet to port 222. In contrast, VI 604 will receive the packet from VS 216 and forward it to port 602, which then transmits the packet to packet switch 202. In the event of an interruption of the connection between port 602 and packet switch 202, VI 220 may be configured to transmit the packet to port 222.

The advantage of sending the packet to both VI 604 and VI 220 is that in the event of a failover from primary to backup the virtual switch is already forwarding the packet to both VI 604 and VI 220 so the packet will already be in place and can be quickly forwarded.

In some cases, the failover may take place without having to change configuration 240. For example, VS 216 may not even know about the failover from primary to backup. Instead, port 602 and port 222 may be the entities aware of primary or backup status. In this manner, VS 216 may be configured to forward packets it receives from one of its virtual interfaces to two other virtual interfaces without consulting a table of learned source addresses 270. For example, VS 216 may receive a packet from VI 224 and flood the packet to VI 604 and VI 220 without consulting table 270.

Virtual switches of a packet switch may be configured with different thresholds. For example, since VS 216 has a primary path and a backup path, VS 216 may be configured to have a threshold of three so that if the number of virtual interfaces associated with VS 216 is less than or equal to three, learning will be disabled. If the number of virtual interfaces associated with VS 216 is greater than three, learning will be enabled.

On the other hand, since VS 218 does not have primary path and a backup path, VS 218 may be configured to have a threshold of two so that learning is disabled if the number of virtual interfaces associated with VS 218 is less than or equal to two.

According to another aspect of the invention, a management system compares a quantity of virtual interfaces associated with a virtual switch of a packet switch to a threshold. If the quantity of virtual interfaces is not greater than the threshold and the packet switch is configured to learn source addresses of packets forwarded by the virtual switch, the management system directs the packet switch to not learn source addresses of packets subsequently forwarded by the virtual switch.

The management system may also direct the packet switch to learn source addresses of packets subsequently forwarded by the virtual switch if the quantity of virtual interfaces is greater than the threshold and the packet switch is configured to not learn source addresses of packets forwarded by the virtual switch. Comparing the quantity of virtual interfaces may include inspecting a configuration of the virtual switch. The configuration may be stored by the management system in a location external to the packet switch.

Directing the packet switch may include sending the packet switch at least one of a simple network management protocol (SNMP) message, a configuration file, an eXtensible Markup Language (XML) message, or a command line interface command. The source addresses of the packets subsequently forwarded by the packet switch may be layer-two source addresses and the packets subsequently forwarded by the virtual switch may be Ethernet packets.

FIG. 7 illustrates a system 700. System 700 includes a management system 702 connected to three packet switches 704, 706, and 708 by a management network 710. Management network 710 may be an in-band management network, an out-of-band management network, or another type of management network.

Management system 702 may provide packet switches 704, 706, and 708 with their configurations. For example, when a user first configures a virtual switch, the user may interact with management system 702 to establish the virtual interfaces that are to be associated with the virtual switch. Management system 702 may store this configuration information received from the user in a configuration 712. Configuration 712 may be associated with a particular packet switch, for example packet switch 704.

After receiving the desired configuration from the user and storing it in configuration 712, management system 702 may send a copy of configuration 712 to packet switch 704. Packet switch 704 may store this configuration as configuration 718 and operate according to configuration 718. Accordingly, the desired virtual switch and virtual interface as specified by the user will be implemented on packet switch 704 by configuration 718.

System 700 may prevent a user from configuring a packet switch directly. For example, system 700 may prevent a user from directly connecting to packet switch 704 to change configuration 718. Instead, system 700 may require the user to connect to management system 702 and change configuration 712. Management system 702 may then subsequently forward configuration 712 to packet switch 704.

In some cases, management system 702 may send packet switch 704 an individual configuration command rather than sending an entire configuration. For example, if a user adds an additional virtual interface to a virtual switch by changing configuration 712, rather than sending all of configuration 712 to packet switch 704, management system 702 may send a command to add the virtual interface to configuration 718 to packet switch 704.

Users may be allowed to modify configuration 718 directly. In this case, management system 702 may monitor configuration 718 to determine if there are any changes or differences between configuration 718 and configuration 712. In this manner, management system 702 may ensure that configurations 712 and 718 remain the same by either updating configuration 712 when a user changes configuration 718 directly or by updating configuration 718 when a user changes configuration 712.

Since management system 702 has access to configuration 712, it may periodically monitor configuration 712 to determine if the number of virtual interfaces associated with a virtual switch has changed to either go above the threshold or go below the threshold.

Configuration 714 similarly corresponds with configuration 720 of packet switch 706 and configuration 716 corresponds with configuration 722 of packet switch 708.

Management system 702 may monitor configurations 712, 714, and 716 or configurations 718, 720, and 722, or all six configurations to determine when changes in the number of virtual interfaces associated with a virtual switch occur that move the number of virtual interfaces associated with a virtual switch to be either above or below the threshold.

If the number of virtual interfaces of a virtual switch of packet switch 704 was above the threshold but is now below the threshold, the management system may detect this and consequently send a command to packet switch 704 telling packet switch 704 to disable learning for that particular virtual switch.

Similarly, if management system 702 detects that the number of virtual interfaces associated with a virtual switch of packet switch 704 has gone above the threshold, management system 702 may send a command to packet switch 704 to enable learning for the virtual switch.

Management system 702 may send packet switch 704 a command in a number of ways. For example, management system 702 may send packet switch 704 an SNMP command, an XML message, or a command line interface command to either enable or disable learning as appropriate.

Alternatively, a variable indicating whether learning is enabled or disabled for a particular virtual switch may be a part of configuration 712. In this case, management system 702 updates configuration 712 to have the appropriate learning value and sends configuration 712 to packet switch 704. Packet switch 704 then implements configuration 712 as configuration 718 and uses the new configuration. Management system 702 may also send an XML message to packet switch 704 requesting that learning be either enabled or disabled as appropriate.

System 700 has several advantages. Since management system 702 monitors the configurations to determine if the number of virtual interfaces associated with any of the virtual switches of the packet switches is above the threshold, this function is centralized in management system 702. Accordingly, packets switches 704, 706, and 708 may not need to be capable of monitoring the threshold. This centralizes intelligence in management system 702 and may enable packet switches 704, 706, and 708 to be less sophisticated and therefore less expensive.

Of course, management system 702 may use alternative algorithms. For example, management system 702 may periodically inspect configurations 712, 714, and 716 to determine if the number of virtual interfaces associated with any of the virtual switches has exceeded our gone below the threshold.

Alternatively, the management system 702 may be configured to detect a user-requested change in the number of virtual interfaces associated with a virtual switch. As a result, management system 702 may evaluate whether the new number of virtual interfaces associated with the virtual switch based on the user-requested change is now either above or below the threshold causing a change in the state of learning for that virtual switch.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
   a packet switch determining a quantity of ports of the packet switch that are associated with a Virtual Local Area Network (VLAN) subsequent to the packet switch receiving a command to associate a port of the packet switch not currently associated with the VLAN with the VLAN from a user or a management system;
   if the quantity of ports associated with the VLAN is not greater than two and the packet switch is configured to learn layer-two source addresses of Ethernet packets forwarded within the VLAN, the packet switch configuring, without user intervention, the packet switch to not learn layer two source addresses of Ethernet packets subsequently forwarded within the VLAN; and
   if the quantity of ports associated with the VLAN is greater than two and the packet switch is configured to not learn layer-two source addresses of Ethernet packets forwarded within the VLAN, the packet switch configuring, without user intervention, the packet switch to learn layer-two source addresses of Ethernet packets subsequently forwarded within the VLAN.

2. A packet switch configured to implement the method of claim 1.

3. A packet switch operating method comprising:
   a packet switch comparing a quantity of virtual interfaces associated with a virtual switch to a threshold;
   if the quantity of virtual interfaces associated with the virtual switch is not greater than the threshold and the packet switch is configured to learn forwarding fields of packets forwarded by the virtual switch, the packet switch configuring the packet switch to not learn forwarding fields of packets subsequently forwarded by the virtual switch; and if the quantity of virtual interfaces associated with the virtual switch is greater than the threshold and the packet switch is not configured to learn forwarding fields of packets forwarded by the virtual switch, the packet switch configuring the packet switch to learn forwarding fields of packets subsequently forwarded by the virtual switch.

4. The method of claim 3 further comprising the packet switch detecting a change in the quantity of virtual interfaces associated with the virtual switch prior to the comparing the quantity.

5. The method of claim 3 wherein the comparing the quantity of virtual interfaces comprises the packet switch inspecting a packet switch configuration to determine the quantity of virtual interfaces associated with the virtual switch.

6. The method of claim 3 wherein the configuring the packet switch to learn forwarding fields comprises the packet switch configuring the packet switch to examine forwarding fields of packets received by the virtual switch and, for each of the forwarding fields that are unique, store an association between the unique forwarding field, the virtual switch, and a virtual interface, the virtual interface being the virtual interface of the plurality on which the packet having the unique forwarding field is received.

7. The method of claim 3 wherein the threshold is two.

8. The method of claim 3 wherein the threshold is three.

9. The method of claim 3 wherein the comparing the quantity of virtual interfaces and the configuring the packet switch are performed without user intervention.

10. The method of claim 3 wherein the forwarding fields of the packets subsequently forwarded by the virtual switch are layer-two Ethernet source addresses.

11. The method of claim 3 wherein the forwarding fields comprise at least one of layer-two source addresses, layer-two destination addresses, layer-three source addresses, layer-three destination addresses, layer-four port numbers, backbone destination addresses, or backbone source addresses.

12. The method of claim 3 wherein the virtual switch comprises a VLAN and the virtual interfaces comprise ports of the packet switch associated with the VLAN.

13. The method of claim 3 wherein the packet switch comprises one or more additional virtual switches in addition to the virtual switch.

14. The method of claim 13 wherein the virtual switch is configured to forward a packet received from one of the virtual interfaces to a different one of the virtual interfaces and is configured to prevent the packet received from one of the virtual interfaces from being forwarded to a virtual interface associated with one of the additional virtual switches.

15. A packet switch configured to implement the method of claim 3.

16. A management system operating method comprising:
a management system comparing a quantity of virtual interfaces associated with a virtual switch of a packet switch to a threshold;

if the quantity of virtual interfaces is not greater than the threshold and the packet switch is configured to learn source addresses of packets forwarded by the virtual switch, the management system directing the packet switch to not learn source addresses of packets subsequently forwarded by the virtual switch; and if the quantity of virtual interfaces is greater than the threshold and the packet switch is configured to not learn source addresses of packets forwarded by the virtual switch, the management system directing the packet switch to learn source addresses of packets subsequently forwarded by the virtual switch.

17. The method of claim 16 wherein the comparing the quantity of virtual interfaces comprises the management system inspecting a configuration of the virtual switch.

18. The method of claim 17 wherein the configuration is stored by the management system in a location external to the packet switch.

19. The method of claim 16 wherein the directing the packet switch comprises the management system sending the packet switch at least one of a Simple Network Management Protocol (SNMP) message, an Extensible Markup language (XML) message, a configuration file, or a Command Line Interface (CLI) command.

20. The method of claim 16 wherein the source addresses of the packets subsequently forwarded by the virtual switch are layer-two source addresses and the packets subsequently forwarded by the virtual switch are Ethernet packets.

21. A management system, including a packets switch, wherein the management system is configured to implement the method of claim 16.

22. The method of claim 1 wherein the ports are configured to send and/or receive packets.

23. The method of claim 1 wherein at least one of the ports associated with the VLAN is configured to receive packets having different source addresses relative to one another.

24. The method of claim 1 further comprising:
if the quantity of ports associated with the VLAN is not greater than two and the packet switch is configured to learn layer-two source addresses of Ethernet packets forwarded within the VLAN, the packet switch configuring, without user intervention, the packet switch to flood all Ethernet packets belonging to the VLAN that are subsequently received by the packet switch.

* * * * *